United States Patent
Ueda

(10) Patent No.: US 10,877,538 B2
(45) Date of Patent: Dec. 29, 2020

(54) ARITHMETIC UNIT AND CONTROL APPARATUS

(71) Applicant: OMRON Corporation, Kyoto (JP)

(72) Inventor: Hiroaki Ueda, Otsu (JP)

(73) Assignee: OMRON Corporation, Kyoto (JP)

( * ) Notice: Subject to any disclaimer, the term of this patent is extended or adjusted under 35 U.S.C. 154(b) by 115 days.

(21) Appl. No.: 16/221,633

(22) Filed: Dec. 17, 2018

(65) Prior Publication Data

US 2019/0278351 A1    Sep. 12, 2019

(30) Foreign Application Priority Data

Mar. 12, 2018    (JP) ................ 2018-044522

(51) Int. Cl.

| | |
|---|---|
| *G06F 11/30* | (2006.01) |
| *G06F 1/28* | (2006.01) |
| *G06F 13/38* | (2006.01) |
| *G06F 1/26* | (2006.01) |
| *G06F 1/30* | (2006.01) |
| *H02J 7/34* | (2006.01) |
| *H02J 9/06* | (2006.01) |
| *G06F 1/3203* | (2019.01) |

(52) U.S. Cl.
CPC ............... *G06F 1/28* (2013.01); *G06F 1/263* (2013.01); *G06F 1/30* (2013.01); *G06F 13/38* (2013.01); *G06F 1/3203* (2013.01); *H02J 7/345* (2013.01); *H02J 9/061* (2013.01)

(58) Field of Classification Search
CPC ... G06F 1/28; G06F 1/263; G06F 1/30; G06F 13/38; H02J 7/345; H02J 9/061
USPC .......................................................... 713/340
See application file for complete search history.

(56) References Cited

U.S. PATENT DOCUMENTS

| | | | | |
|---|---|---|---|---|
| 4,638,175 | A * | 1/1987 | Bradford | G06F 1/189 307/64 |
| 6,034,444 | A * | 3/2000 | Kuruma | H02J 3/38 307/80 |
| 2010/0332896 | A1* | 12/2010 | Wilson | G06F 1/30 714/14 |
| 2011/0072290 | A1* | 3/2011 | Davis | G06F 1/30 713/324 |
| 2012/0241417 | A1* | 9/2012 | Mehn | B23K 9/1006 219/108 |

(Continued)

FOREIGN PATENT DOCUMENTS

JP    2009223418    10/2009

OTHER PUBLICATIONS

"Search Report of Europe Counterpart Application", dated Jun. 25, 2019, p. 1-p. 10.

(Continued)

*Primary Examiner* — Volvick Derose
(74) *Attorney, Agent, or Firm* — JCIPRNET

(57) ABSTRACT

There is expected a technique capable of determining a power supply state with respect to an arithmetic unit according to a connection status with a power supply unit. The arithmetic unit includes a state management circuit outputting a state signal indicating whether or not supply of power from the power supply circuit is valid. The state management circuit of the arithmetic unit determines a value of the state signal based on a voltage of a second port, a voltage of a first port, and a signal indicating whether or not the power supply unit exists.

15 Claims, 4 Drawing Sheets

(56) References Cited

U.S. PATENT DOCUMENTS

| | | | | |
|---|---|---|---|---|
| 2015/0016206 A1* | 1/2015 | Hauck | ............ | H02J 7/345 |
| | | | | 365/229 |
| 2015/0121104 A1* | 4/2015 | Kinouchi | ............ | G06F 1/3287 |
| | | | | 713/322 |
| 2015/0268709 A1* | 9/2015 | Morning-Smith | ...... | H02J 7/345 |
| | | | | 307/23 |
| 2017/0039116 A1* | 2/2017 | Kelly | ............ | G06F 1/30 |

OTHER PUBLICATIONS

Linear Technology, "LTC3350 High Current Supercapacitor Backup Controller and System Monitor", Aug. 1, 2015, pp. 1-46.

Texas Instruments, "TIDA-00304-"Last Gasp" Hold Up Energy Storage Solution", Jul. 2014, pp. 1-16.

"Office Action of Europe Counterpart Application", dated Jul. 7, 2020, pp. 1-12.

* cited by examiner

| 381 PRSN | 382 XP_PSPF | 383 24V_PSPF | 384 50V_PSPF | 385 Activation enable/disable |
|---|---|---|---|---|
| Absent | — | ○ | ○ | OK |
| Absent | — | ○ | × | NG |
| Absent | — | × | ○ | NG |
| Present | ○ | — | ○ | OK |
| Present | ○ | — | × | NG |
| Present | × | — | ○ | NG |
| Present | × | — | × | NG |

ARITHMETIC UNIT AND CONTROL APPARATUS

CROSS-REFERENCE TO RELATED APPLICATION

This application claims the priority benefit of Japan Application No. 2018-044522, filed on Mar. 12, 2018. The entirety of the above-mentioned patent application is hereby incorporated by reference herein and made a part of this specification.

BACKGROUND

Technical Field

The disclosure relates to processing according to a power supply state of an arithmetic unit.

Related Art

In a factory automation (FA) system, a control apparatus that controls an input-output device in production equipment includes one or a plurality of arithmetic units, wherein the arithmetic unit and the device whose operation is controlled by the arithmetic unit are connected to a network. In this way, the arithmetic unit and the input-output device cyclically communicate via the network, and transmit and receive communication data to control the production equipment.

For example, Japanese Laid-open No. 2009-223418 discloses the following content. In an industrial controller having two duplicate CPU units, an active-side arithmetic unit to which a communication cable with a control program development apparatus (tool apparatus) is connected determines whether or not a command frame transmitted from the tool apparatus is addressed to the active-side arithmetic unit itself. In the case where the command frame is addressed to the active-side arithmetic unit itself, the active-side arithmetic unit transmits a response frame to the tool apparatus; in the case where the command frame is not addressed to the active-side arithmetic unit itself, the active-side arithmetic unit transfers the command frame to a standby-side arithmetic unit to which the communication cable with the tool apparatus is not connected. The standby-side arithmetic unit creates a response frame including an execution result based on the transmitted response frame, and transmits the response frame to the active-side arithmetic unit.

SUMMARY

The arithmetic unit may be used without being connected to a power supply unit or may be connected to a power supply unit to be used. Hence, in order to determine a power supply state with respect to the arithmetic unit, processing according to such a connection status with the power supply unit is required.

The disclosure provides a configuration capable of determining the power supply state with respect to the arithmetic unit based on presence or absence of connection with the power supply unit and a method for supplying power.

In an example of the disclosure, an arithmetic unit includes: an arithmetic processing part, including a processor; a bus master part, connected to the arithmetic processing part and managing data transmission on a local bus; and a power supply circuit, receiving power from outside and supplying power to the arithmetic processing part and the bus master part. The power supply circuit includes: a first port, receiving power from a power supply unit included in a control apparatus; a second port, receiving power from a power supply apparatus different from the power supply unit; a backup circuit, connected to both the first port and the second port; a detection circuit, detecting existence of the power supply unit; and a state management circuit, outputting a state signal indicating whether or not the supply of power from the power supply circuit is valid. The state management circuit determines a value of the state signal based on a voltage of the second port, a voltage of the first port, and a signal indicating whether or not the power supply unit exists.

In a control apparatus, an arithmetic unit includes: an arithmetic processing part including a processor; a bus master part, connected to the arithmetic processing part and managing data transmission on a local bus; and a power supply circuit, receiving power from outside and supplying power to the arithmetic processing part and the bus master part. The power supply circuit includes: a first port, receiving power from a power supply unit included in the control apparatus; a second port, receiving power from a power supply apparatus different from the power supply unit; a backup circuit, connected to both the first port and the second port; a detection circuit, detecting existence of the power supply unit; and a state management circuit, outputting a state signal indicating whether or not the supply of power from the power supply circuit is valid. The state management circuit determines a value of the state signal based on a voltage of the second port, a voltage of the first port, and a signal indicating whether or not the power supply unit exists.

BRIEF DESCRIPTION OF THE DRAWINGS

FIG. 5 shows a correspondence table 380 relating to whether or not the main arithmetic unit 10 can be activated according to the power supply state in accordance with the present embodiment.

DESCRIPTION OF THE EMBODIMENTS

Figure 1:
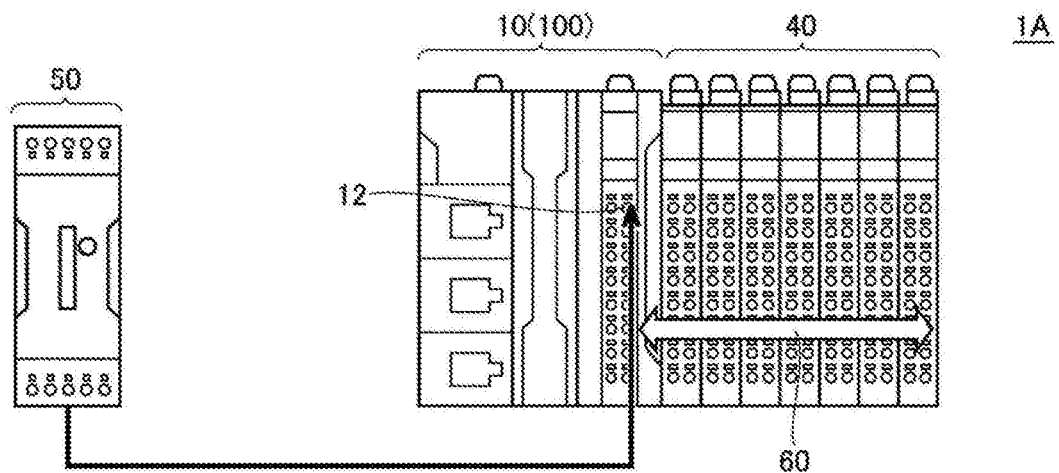
FIG. 1 illustrates a first configuration example of an FA system in accordance with the present embodiment.

According to an example of the disclosure, the arithmetic unit is capable of reliably determining a power supply state.

In an example of the disclosure, when it is detected that the power supply unit does not exist, if the voltage of the second port falls below a predetermined first threshold value, the state management circuit of the arithmetic unit outputs, as the value of the state signal, a value indicating that the supply of power from the power supply circuit is invalid.

According to the example of the disclosure, the arithmetic unit is capable of accurately determining a power supply status according to existence or non-existence of the power supply unit.

In an example of the disclosure, regardless of whether or not the power supply unit exists, the state management circuit of the arithmetic unit outputs, as the value of the state signal, a value indicating that the supply of power from the power supply circuit is invalid when a voltage output from the backup circuit falls below a predetermined second threshold value.

According to the example of the disclosure, the arithmetic unit is capable of reliably executing backup processing in the case where the supply of power is cut off.

In an example of the disclosure, a signal relating to a voltage of power input to the power supply unit is input to the state management circuit of the arithmetic unit. When it is detected that the power supply unit exists, if the voltage of the power input to the power supply unit falls below a predetermined third threshold value, the state management circuit outputs, as the value of the state signal, a value indicating that the supply of power from the power supply circuit is invalid.

According to the example of the disclosure, the arithmetic unit is capable of reliably executing processing in the case where the supply of power is invalid not only on the arithmetic unit itself but also on the other units connected thereto.

In an example of the disclosure, the power supply circuit of the arithmetic unit further includes a blocking circuit for preventing a current from flowing between the first port and the second port.

According to the example of the disclosure, even if power is supplied from any one of a plurality of ports, the arithmetic unit is capable of preventing a current from flowing back to the other ports.

In an example of the disclosure, the power supply circuit includes a first voltage conversion circuit for conversion to a first voltage lower than a voltage appearing at a connection node between the first port and the second port.

According to the example of the disclosure, the arithmetic unit is capable of generating voltages of different values according to driving voltages of each apparatus.

In an example of the disclosure, the backup circuit of the arithmetic unit further includes: a third voltage conversion circuit, arranged between the first port and the second port and the first voltage conversion circuit, and converting power supplied from a second voltage conversion circuit for conversion to a second voltage higher than the first voltage into power having a third voltage lower than the second voltage; and a capacitor, connected between the second voltage conversion circuit and the third voltage conversion circuit and capable of storing at least a part of the power output from the second voltage conversion circuit.

According to the example of the disclosure, by a voltage obtained by converting a voltage corresponding to a residual electric charge of the capacitor by a voltage conversion circuit, the arithmetic unit is capable of ensuring a driving time of a plurality of units for a certain period of time.

In an example of the disclosure, a secondary arithmetic unit is arranged between the power supply unit and the arithmetic unit. The detection circuit detects, in addition to the existence of the power supply unit, existence of the secondary arithmetic unit.

According to the example of the disclosure, the arithmetic unit is capable of reliably detecting existence or non-existence of the secondary arithmetic unit, in addition to the existence or non-existence of the power supply unit.

According to an example of the disclosure, the control apparatus is capable of reliably executing processing in the case where the supply of power is cut off, and is also capable of reliably executing the processing in the case where the supply of power is cut off on other units.

In an aspect of the examples, the power supply state with respect to the arithmetic unit can be determined based on the presence or absence of connection with the power supply unit and the method for supplying power.

Embodiments in accordance with the disclosure are hereinafter explained with reference to the drawings. In the following explanation, the same parts and components are denoted by the same reference numerals, and they also have the same names and functions. Accordingly, detailed explanation thereof will not be repeated.

A. Configuration of FA System

Figure 2:
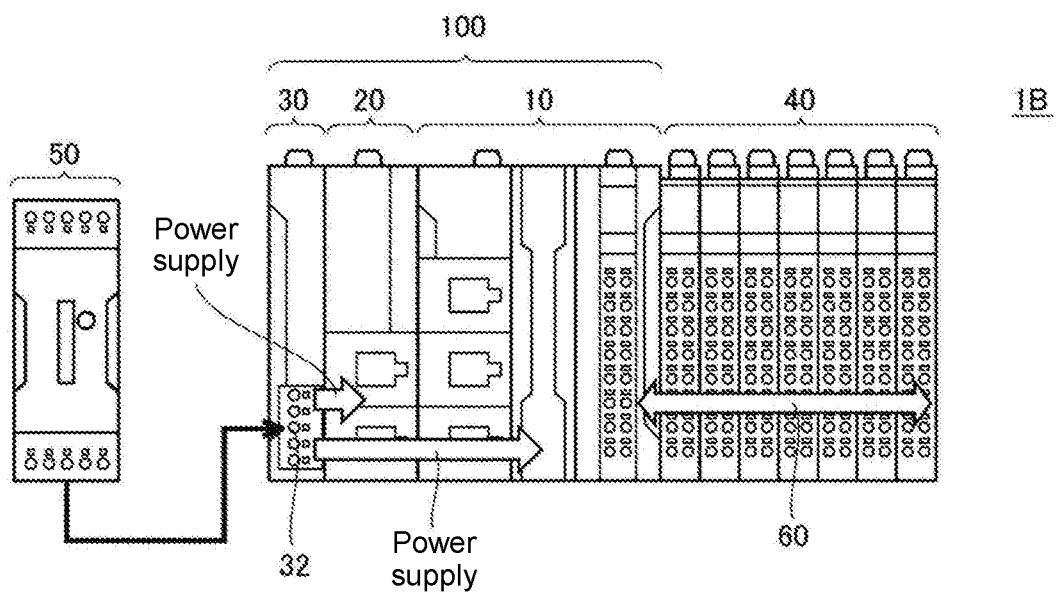
FIG. 2 shows a second configuration example of the FA system in accordance with the present embodiment.

A control system (FA system) of the disclosure is explained with reference to FIG. 1 and FIG. 2. FIG. 1 and FIG. 2 show two configuration examples (1A and 1B) of the FA system in accordance with the present embodiment.

The FA systems 1A and 1B are control systems for controlling a control object such as equipment and an apparatus and automating a production process.

FIG. 1 illustrates a first configuration example of the FA system in accordance with the present embodiment. The FA system 1A being the first configuration example of the FA system includes a main arithmetic unit 10, one or a plurality of functional units 40, and an external power supply 50. The main arithmetic unit 10 is an element constituting the FA system and is equivalent to an arithmetic apparatus controlling processing of the entire FA system. In cases like this where the arithmetic unit of the FA system only includes the main arithmetic unit 10 and does not include other arithmetic units such as a power supply unit to be described later, the main arithmetic unit 10 constitutes a control apparatus 100. The main arithmetic unit 10 exchanges signals relating to setting information or stop of supply of power with the functional unit 40 via a local bus 60. The setting information includes, for example, parameter values in the case where a driving apparatus (e.g., an image sensor) (not shown) connected to the functional unit 40 executes processing (e.g., photographing processing) on a workpiece.

In this way, the functional unit 40 has a function (data collection function) of collecting field information from a machine or equipment or the like being the control object, and/or a function (data output function) of outputting a command signal to the machine or equipment or the like being the control object, and the like.

Specifically, the functional unit 40 is an I/O (Input/Output) unit. Examples of the I/O unit 40 include a digital input (DI) unit, a digital output (DO) unit, an analog input (AI) unit, an analog output (AO) unit, a pulse catch input unit, and a composite unit obtained by mixing a plurality of types of units, and the like.

The external power supply 50 is connected to a second port 12 of the main arithmetic unit 10 and supplies power to the main arithmetic unit 10. A voltage of 24 V, for example, is applied to the second port 12. In cases like this where the main arithmetic unit 10 is not connected to other arithmetic units such as a power supply unit, it is possible for the main arithmetic unit 10 to receive supply of power directly from the second port 12 provided in the main arithmetic unit 10 itself.

FIG. 2 shows a second configuration example of the FA system in accordance with the present embodiment. The FA system 1B being the second configuration example of the FA system is obtained by further adding a new configuration to the configuration of the above-described FA system 1A.

Specifically, the FA system 1B includes, in addition to the main arithmetic unit 10, the I/O unit 40 and the external power supply 50, a power supply unit 30 and a secondary arithmetic unit 20.

The secondary arithmetic unit 20 is a unit electrically connected to the main arithmetic unit 10, executing one processing in cooperation with the main arithmetic unit 10 or executing processing different from that executed by the main arithmetic unit 10, and is a unit for improving throughput or processing speed of the entire FA system. In this way, the secondary arithmetic unit 20 functions as an auxiliary unit supporting the processing of the main arithmetic unit 10.

The power supply unit 30 is a unit having a power port 32, receiving supply of power from the external power supply 50 to the power port 32, and supplying power to the main arithmetic unit 10 and the secondary arithmetic unit 20. Specifically, after the power from the external power supply 50 is supplied to the power supply unit 30, the main arithmetic unit 10 receives supply of power to a first port 11 in FIG. 3 which is to be described later. A voltage of 12 V, for example, is applied to the first port 11. In cases like this where the main arithmetic unit 10 is connected to other arithmetic units such as the power supply unit 30, it is possible for the main arithmetic unit 10 to receive supply of power indirectly from the first port 11 provided in the main arithmetic unit 10 itself.

In cases like this where the arithmetic unit of the FA system includes the main arithmetic unit 10, the secondary arithmetic unit 20, and the power supply unit 30 that supplies power to these arithmetic units, the main arithmetic unit 10, the secondary arithmetic unit 20 and the power supply unit 30 constitute the control apparatus 100.

Hence, as a power supply receiving pattern of the control apparatus 100 at least including the main arithmetic unit 10, there are two power supplying patterns, i.e., the case of indirectly receiving supply of power from the first port 11 and the case of directly receiving supply of power from the second port 12. The main arithmetic unit 10 reliably detects a power supply state according to the power supplying pattern that depends on a connection state with such a power supply unit 30.

In addition, as a configuration of connection between the main arithmetic unit and other units, there are a configuration (first configuration) only including the main arithmetic unit 10 as shown in FIG. 1, a configuration (second configuration) including the main arithmetic unit 10, the secondary arithmetic unit 20 and the power supply unit 30 as shown in FIG. 2, and a configuration (third configuration) including the main arithmetic unit 10 and the power supply unit 30. In the first configuration, the main arithmetic unit 10 receives supply of power from the second port 12. In the second or third configuration, the main arithmetic unit 10 receives supply of power from the first port 11. In a configuration in which the main arithmetic unit 10 and the secondary arithmetic unit 20 are connected (i.e., a configuration in which the power supply unit 30 is not connected), since power cannot be supplied to the secondary arithmetic unit 20 even if power is received from the second port 12, explanation will be continued assuming that such the configuration is not adopted. In addition, in the second configuration, a plurality of secondary arithmetic units 20 instead of only one may be provided between the main arithmetic unit 10 and the power supply unit 30.

In the following, a circuit configuration including the main arithmetic unit 10 of the control apparatus 100 and operation thereof are explained with reference to FIG. 3.

B. Circuit Configuration and Operation of Main Arithmetic Unit 10

Figure 3:
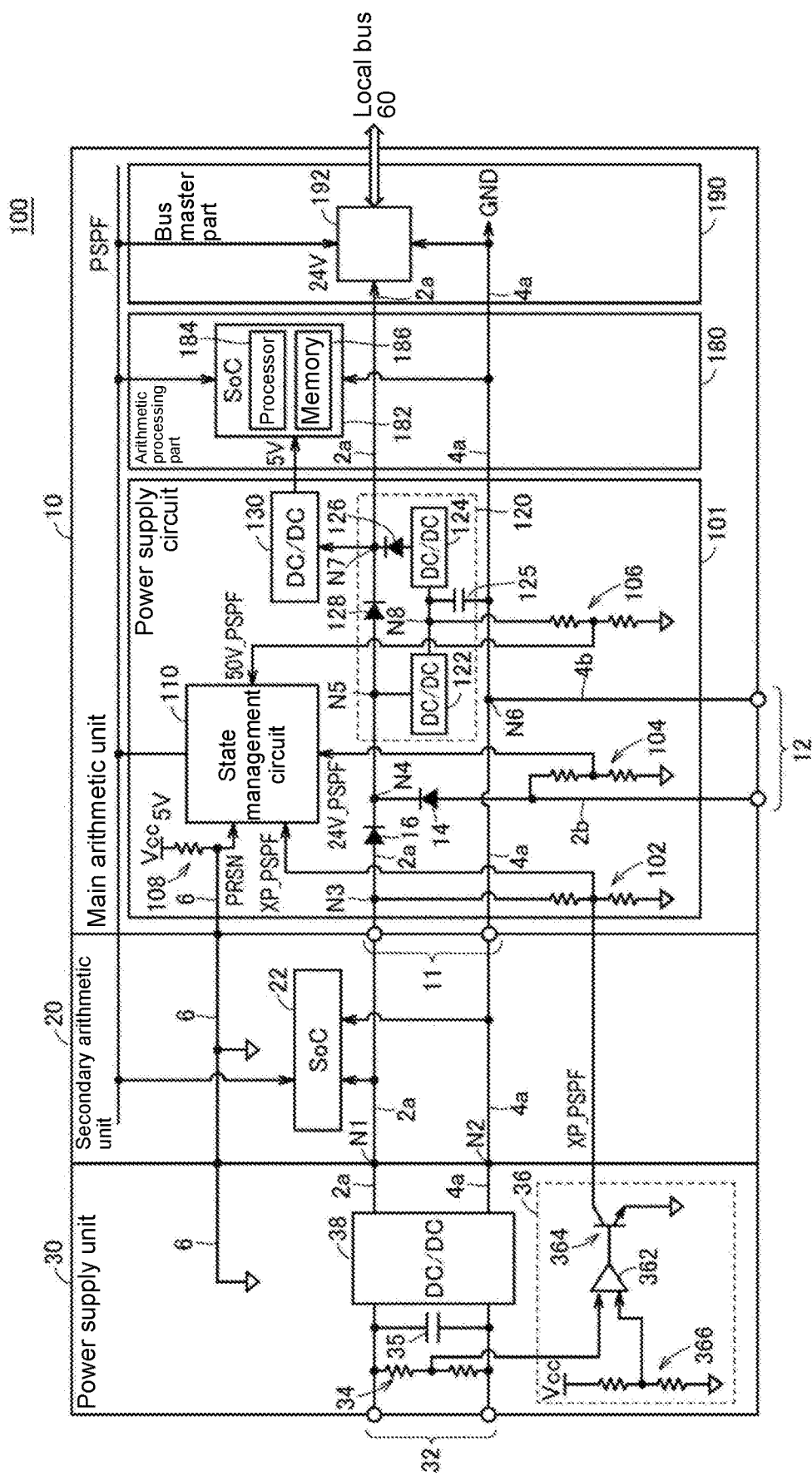
FIG. 3 illustrates a circuit configuration of a control apparatus 100 including a main arithmetic unit 10, a secondary arithmetic unit 20 and a power supply unit 30, in accordance with the present embodiment.

FIG. 3 illustrates a circuit configuration of the control apparatus 100 including the main arithmetic unit 10, the secondary arithmetic unit 20 and the power supply unit 30, in accordance with the present embodiment.

The main arithmetic unit 10 in FIG. 3 is a unit constituting a part of the control apparatus 100, including a power supply circuit 101, an arithmetic processing part 180 and a bus master part 190.

The arithmetic processing part 180 executes various processing in the main arithmetic unit 10. The arithmetic processing part 180 includes a system on a chip (SoC) 182 which at least has a processor 184 and a memory 186. The SoC 182 is a semiconductor chip in which the processor 184, the memory 186 and the like are integrated.

The processor 184 executes various processing in the main arithmetic unit 10 by developing and executing programs recorded in the memory 186. Moreover, the SoC 182 is driven based on a voltage (e.g., 5 V) obtained by stepping down a voltage (e.g., 12 V) based on a potential difference between a potential of a first power line 2a and a potential GND of a first ground line 4a by a first voltage conversion circuit 130 of the power supply circuit 101. Specifically, the first voltage conversion circuit 130 is a DC/DC converter.

A voltage (e.g., 5 V) converted and output by the first voltage conversion circuit 130 is a voltage supplied from the first port 11 and is a voltage lower than a voltage (12 V) which becomes a potential difference between a potential of a node (connection node) N4 and a potential of a node N6. Also, the voltage (e.g., 5 V) converted and output by the first voltage conversion circuit 130 is a voltage supplied from the second port 12 and is a voltage lower than a voltage (24 V) which becomes a potential difference between the potential of the node N4 and the potential of the node N6. In this way, the first voltage conversion circuit 130 of the power supply circuit 101 is capable of performing conversion to a voltage (e.g., 5 V) lower than a voltage (e.g., 12 V or 24 V) appearing between the nodes N4 and N6 between the first port 11 and the second port 12. Accordingly, the main arithmetic unit 10 is capable of generating voltages of different values according to driving voltages of each apparatus.

The bus master part 190 manages data transmission on an internal bus that exchanges communication data with the functional unit 40. The bus master part 190 includes a communication circuit 192.

The communication circuit 192 manages data transmission on a field network that exchanges the communication data with the functional unit 40. As such the field network, fixed-cycle networks such as EtherCAT (registered trademark), EtherNet/IP (registered trademark), DeviceNet (registered trademark), CompoNet (registered trademark) and so on may be used. The communication circuit 192 exchanges the communication data with the functional unit 40 by the local bus 60.

The power supply circuit 101 has the second port 12 receiving supply of power from a power supply apparatus different from the power supply unit 30. A voltage (e.g., 24 V) being a potential difference between a potential of a second power line 2b and a potential of a second ground line 4b, wherein the second power line 2b and the second ground line 4b are connected to the second port 12, is applied to a first voltage divider 104.

The first voltage divider 104 inputs, to a state management circuit 110 via a signal line 24V_PSPF, a voltage (e.g., 12 V) obtained by resistance-dividing the applied voltage. One end of the first voltage divider 104 is grounded.

The state management circuit 110 is a circuit managing a power supply state with respect to the main arithmetic unit 10. When it is detected that no other units exist in the main arithmetic unit 10, if the voltage input from the first voltage divider 104 falls below a predetermined threshold value, the state management circuit 110 determines that the supply of power is invalid. The voltage input to the first voltage divider 104 is the voltage input from the second port 12. In addition, "other units" refer to the power supply unit 30, or the power supply unit 30 and the secondary arithmetic unit 20, and at least include the power supply unit 30.

In cases like this where the power supply unit 30 does not exist and the voltage input from the second port 12 is determined to be equal to or lower than the threshold value, the state management circuit 110 outputs, to the bus master part 190 via a signal line PSPF, a value indicating that the supply of power from the power supply circuit 101 is invalid. Accordingly, the main arithmetic unit 10 is capable of accurately determining a power supply status according to existence or non-existence of the power supply unit 30. The threshold value may be held within the state management circuit 110 or may be held in the memory 186 of the arithmetic processing part 180.

The communication circuit 192 of the bus master part 190 exchanges communication data including information relating to cutoff of power supply with the functional unit 40 via the local bus 60. Specifically, the functional unit 40 receives the information relating to cutoff of power supply from the bus master part 190, and prepares for the cutoff of power supply by executing processing with higher priority before the other processing. The functional unit 40 is powered off after the power supply is cut off.

In the case where power is supplied from the second port 12 and the voltage of the first voltage divider 104 becomes equal to or higher than the threshold value, a current flowing through the second power line 2b flows to the node N4 via a diode 14 and then flows into the first voltage conversion circuit 130 via a diode 128, and a current also flows into the communication circuit 192 of the bus master part 190. In this way, in the control apparatus 100, the SoC 182 of the arithmetic processing part 180 and the communication circuit 192 of the bus master part 190 can be driven.

Herein, the determination of presence or absence of connection between the main arithmetic unit 10 and other units is specifically explained. A state in which no other units are connected to the main arithmetic unit 10 (i.e., no other units exist) refers to, for example, a state in which the power supply unit 30 is not connected to the main arithmetic unit 10, or a state in which neither the power supply unit 30 nor the secondary arithmetic unit 20 is connected to the main arithmetic unit 10.

A state in which other units are connected to the main arithmetic unit 10 (i.e., other units exist) refers to, for example, a state in which the secondary arithmetic unit 20 is arranged between the main arithmetic unit 10 and the power supply unit 30, and the main arithmetic unit 10, the secondary arithmetic unit 20 and the power supply unit 30 are connected via the first power line 2a and the first ground line 4a. By providing the secondary arithmetic unit 20 in addition to the main arithmetic unit 10 in this way, processing capacity including the throughput and the processing speed of the arithmetic unit is improved. As another example of the connected state, the power supply unit 30 is directly connected to the main arithmetic unit 10 without arranging the secondary arithmetic unit 20 between the main arithmetic unit 10 and the power supply unit 30.

Next, a method for detecting the existence or non-existence of other units by the state management circuit 110 is explained. The power supply unit 30 is explained as an example of the other units. The state management circuit 110 detects a signal relating to the connection state between the main arithmetic unit 10 and the power supply unit 30. Specifically, the state management circuit 110 has a detection resistor 108 detecting the connection state between the main arithmetic unit 10 and the power supply unit 30. The state management circuit 110 receives, via a signal line PRSN, a signal obtained by applying a control voltage Vcc (e.g., 5 V) to the detection resistor 108. In the case where the power supply unit 30 is not connected to the main arithmetic unit 10, the voltage of the detection resistor 108 holds the voltage (5 V) of the control voltage Vcc. Hence, the state management circuit 110 receives a signal of the control voltage (e.g., 5 V).

In contrast, in the case where the power supply unit 30 is connected to the main arithmetic unit 10, the voltage applied to the detection resistor 108 has the same potential as the ground via a connection line 6. Hence, the state management circuit 110 receives a signal having the same potential (0 V) as the ground. Accordingly, in the case where the signal received via the signal line PRSN indicates the control voltage (e.g., 5 V), the state management circuit 110 detects that the power supply unit 30 does not exist. In addition, in the case where the signal received via the signal line PRSN indicates a voltage (0 V) having the same potential as the ground, the state management circuit 110 detects that the power supply unit 30 exists. In the above explanation, the case of the power supply unit 30 has been explained. However, the presence or absence of connection with the power supply unit 30 and the secondary arithmetic unit 20 can be detected in the same way. Accordingly, based on the signal output from the detection resistor (detection circuit) 180, the main arithmetic unit 10 is capable of reliably detecting the existence or non-existence of the secondary arithmetic unit 20 in addition to the existence or non-existence of the power supply unit 30.

In addition, in the case where power is supplied from the second port 12 as described above, a current flows in a forward direction (anode→cathode) of the diode 14 of the second power line 2b, but the flowing current does not flow in a backward direction (cathode→anode) of a diode 16 at the node N4. In addition, in the later-described case where power is supplied from the first port 11, a current flows in the forward direction of the diode 16, but does not flow in the backward direction of the diode 14. In this way, by providing a blocking circuit that prevents a current from flowing between the first port 11 and the second port 12, even if power is supplied from any one of a plurality of ports, the main arithmetic unit 10 is capable of preventing a current from flowing back to the other ports.

In addition, a current also flows in the forward direction in the diode 128 at a subsequent stage, but the flowing current does not flow in the backward direction of a diode 126 at a node N7.

Next, a circuit configuration and circuit operation of a backup circuit 120 arranged between the first port 11 and the second port 12 and the first voltage conversion circuit 130 are explained. Specifically, the backup circuit 120 includes: the diode 128 provided between a node N5 and the node N7 and having its forward direction from the node N5 to the node N7; and a second voltage conversion circuit 122 boosting (e.g., to 50 V) a voltage (e.g., 12 V) of the node N5.

In addition, the backup circuit 120 includes: a capacitor 125 charged with electric charge output from the second voltage conversion circuit 122; a third voltage conversion circuit 124 stepping down (e.g., to 14 V) a voltage (e.g., 50 V) corresponding to the electric charge after charging; and the diode 126 provided between the third voltage conversion circuit 124 and the node N7 and having its forward direction from the third voltage conversion circuit 124 to the node N7.

In the case where predetermined electric charge is charged into the capacitor 125, even if the supply of power is cut off from both the first port 11 and the second port 12, by a predetermined voltage corresponding to the electric charge of the capacitor 125, a current can be supplied to the first voltage conversion circuit 130. In this way, even if the supply of power to the main arithmetic unit 10 is cut off, in the control apparatus 100, by operating a circuit including the capacitor 125 as a backup circuit, short-time operation of the arithmetic processing part 180 or the like is enabled by residual electric charge in the capacitor 125.

Specifically, the main arithmetic unit 10 of the control apparatus 100 converts the voltage (50 V) corresponding to the residual electric charge of the capacitor 125 into a voltage (5 V) converted by the first voltage conversion circuit 130 or a voltage (14 V) converted by the third voltage conversion circuit 124, a certain time for driving a plurality of units including the SoC 182 of the arithmetic processing part 180 of the main arithmetic unit 10 itself and the functional unit 40 can be ensured. These units are capable of reliably executing processing including saving of data and so on in the case where the supply of power is cut off during the certain time.

A second voltage divider 106 is provided at a node N8 between the second voltage conversion circuit 122 and the capacitor 125. The second voltage divider 106 inputs, to the state management circuit 110 via a signal line 50V_PSPF, a voltage (e.g., 25 V) obtained by resistance-dividing the voltage (e.g., 50 V) corresponding to the electric charge charged into the capacitor 125. One end of the second voltage divider 106 is grounded.

Regardless of whether or not the power supply unit 30 is connected to the main arithmetic unit 10 (regardless of whether or not the power supply unit 30 exists), when the voltage input from the second voltage divider 106 falls below a predetermined threshold value, the state management circuit 110 determines that the supply of power is invalid. When such a determination is made, the state management circuit 110 outputs, to the bus master part 190 via the signal line PSPF, a value indicating that the supply of power from the power supply circuit 101 is invalid. The threshold value may be held within the state management circuit 110 or may be held in the memory 186 of the arithmetic processing part 180.

The communication circuit 192 of the bus master part 190 exchanges communication data including information relating to cutoff of power supply with the functional unit 40 via the local bus 60. Specifically, the functional unit 40 receives the information relating to cutoff of power supply from the bus master part 190, and prepares for the cutoff of power supply by executing processing with higher priority before the other processing. The functional unit 40 is powered off after the power supply is cut off.

In this way, the main arithmetic unit 10 of the control apparatus 100 performs determination based on a backup voltage state, regardless of the connection state (presence or absence) between the main arithmetic unit 10 itself and the secondary arithmetic unit 20 as well as the power supply unit 30. The reason is that, even if power is currently being supplied, when the supply of power is subsequently cut off, it becomes impossible for the main arithmetic unit 10 to execute processing for backup using the electric charge of the capacitor 125. Hence, by determining whether the supply of power is valid or invalid according to the backup voltage state, the backup processing in the case where the supply of power is cut off can be reliably executed. The main arithmetic unit 10 is capable of notifying the functional unit 40 and the like of signals respectively according to the valid and invalid states of the power supply state with respect to the main arithmetic unit 10 itself. In addition, the main arithmetic unit 10 itself is also capable of executing the saving of data and so on when the supply of power is cut off.

The power of both ports, i.e., the power received by the second port 12 and the power received by the first port 11, can be supplied to the node N5 provided with the backup circuit 120. In this way, the backup circuit 120 is a circuit connected to both the first port 11 and the second port 12. Hence, in the control apparatus 100, even if power is supplied from any one of a plurality of ports, electric charge can be charged into the capacitor 125 and power of a backup power supply can be easily secured.

C. Circuit Configuration and Operation of Secondary Arithmetic Unit 20

A voltage output from a voltage conversion part 38 of the power supply unit 30 is applied to the secondary arithmetic unit 20. Specifically, a voltage (e.g., 12 V) being an output voltage from the voltage conversion part 38 (being a DC/DC converter) and being a potential difference between a potential of a node N1 and a potential of a node N2 is applied to an SoC 22 of the secondary arithmetic unit 20, and the SoC 22 is driven based on the voltage. Like the SoC 182 of the arithmetic processing part 180, the SoC 22 is a semiconductor chip in which a processor, a memory and the like are integrated. The SoC 22 is driven based on the voltage (e.g., 12 V) based on the potential difference between the potential of the first power line 2a and the potential GND of the first ground line 4a, which is the power supplied from the power supply unit 30.

The secondary arithmetic unit 20 is a unit for improving the throughput or processing speed of the entire FA system by executing processing in cooperation with the main arithmetic unit 10 or executing processing separately from the main arithmetic unit 10. In this way, the secondary arithmetic unit 20 functions as a support unit of the main arithmetic unit 10.

In the case where the secondary arithmetic unit 20 and the power supply unit 30 are connected to the main arithmetic unit 10, the voltage of the detection resistor 108 becomes the same potential (0 V) as the ground via the connection line 6. A signal corresponding to the voltage of the detection resistor 108 having the same potential as the ground is input to the state management circuit 110 via the signal line PRSN. In contrast, in the case where the secondary arithmetic unit 20 and the power supply unit 30 are not connected to the main arithmetic unit 10, the voltage of the detection resistor 108 becomes the control voltage (5 V) via the connection line 6. A signal corresponding to the voltage of the detection resistor 108 having the same potential as the control voltage is input to the state management circuit 110 via the signal line PRSN. In this way, based on the input signal, the state management circuit 110 detects the existence of the secondary arithmetic unit 20 arranged between the power supply unit 30 and the main arithmetic unit 10 or the existence of the power supply unit 30. In this way, based on information of the detection resistor 108, the main arithmetic unit 10 is capable of detecting the presence or absence of connection with (the existence or nonexistence of) the secondary arithmetic unit 20 and the power supply unit 30.

D. Circuit Configuration and Operation of Power Supply Unit 30

The power supply unit 30 is a unit supplying power to the main arithmetic unit 10 and the secondary arithmetic unit 20, and is a unit constituting a part of the control apparatus 100.

The power supply unit 30 includes the power port 32, a third voltage divider 34, a capacitor 35, an output circuit 36, and the voltage conversion part 38. The power port 32 is a port receiving supply of power from the external power supply 50, and a voltage from the external power supply 50 is applied to the power port 32. Specifically, a voltage which is the potential difference between the potential of the power line connected to the power port 32 and the potential of the ground line connected to the power port 32 is applied to the third voltage divider 34, the capacitor 35 provided at a subsequent stage to the third voltage divider 34, and the voltage conversion part 38.

The capacitor 35 is a circuit storing electric charge, and smoothes a current so that ripples are suppressed and the current becomes closer to direct current. By such a function of the capacitor 35, the control apparatus 100 is capable of executing smoothing processing on the power supplied to the arithmetic unit including the main arithmetic unit 10 and the secondary arithmetic unit 20.

The voltage conversion part 38 is a DC/DC converter, stepping down the input voltage (e.g., 24 V) to a predetermined voltage (e.g., 12 V) and outputting it to the secondary arithmetic unit 20. Hence, the potential difference between the potential of the node N1 on the first power line 2a and the potential of the node N2 on the first ground line 4a becomes 12 V, and this voltage is applied to the SoC 22 of the secondary arithmetic unit 20 or the first port 11 of the main arithmetic unit 10.

The third voltage divider 34 is used as a voltage detection part detecting the voltage (e.g., 24 V) input to the power port 32 from the external power supply 50. The output voltage of the third voltage divider 34 is input to a comparator 362 of the output circuit 36.

In this way, the power supply unit 30 is capable of supplying stable power to each of the main arithmetic unit 10 and the secondary arithmetic unit 20.

Next, the output circuit 36 is explained. The output circuit 36 includes the comparator 362, a transistor 364 and a reference generation circuit 366. The output circuit 36 compares a voltage input to one input terminal of the comparator 362 with a reference value input to the other input terminal. The control voltage Vcc (e.g., 5 V) is input to the reference generation circuit 366, and a voltage (e.g., 2.5 V) obtained by resistance-dividing the control voltage Vcc is input, as a reference voltage, to the other input terminal of the comparator 362. One end of the reference generation circuit 366 is grounded.

In the case where the input voltage from the third voltage divider 34 is equal to or higher than the reference voltage, a Low signal is output from an output terminal of the comparator 362. The signal output from the output terminal is output to a base of the transistor 364. In this way, that the input voltage becomes equal to or higher than the reference voltage means that the voltage (e.g., 24 V) from the external power supply 50 is applied to the power port 32.

Although the transistor 364 is explained as an NPN transistor as an example, the transistor 364 may be a PNP transistor or a MOSFET (Metal Oxide Semiconductor Field Effect Transistor) as long as the present embodiment can be realized.

A voltage divided by a fourth voltage divider 102 is applied to a collector of the transistor 364. In the case where the Low signal is output from the comparator 362, the transistor 364 is not turned on and no current flows between the collector and a grounded emitter.

In this way, in the case where a voltage of 12 V, for example, is applied to the node N3, and the voltage divided by the fourth voltage divider 102 becomes, for example, 5 V, the output circuit 36 sends such the voltage as a detection signal to the state management circuit 110 via a signal line XP_PSPF. The state management circuit 110 determines that power is being supplied based on the received detection signal.

In contrast, in the case where the input voltage from the third voltage divider 34 to the comparator 362 becomes lower than the reference voltage, a High signal is sent from the comparator 362 to the base of the transistor 364, and the transistor 364 is turned on. In this way, that the input voltage becomes lower than the reference voltage means that the voltage (e.g., 24 V) from the external power supply 50 is not applied to the power port 32. That means the supply of power from the external power supply 50 is cut off.

By turning on the transistor 364, the voltage (e.g., 5 V) of the fourth voltage divider 102 drops to the same potential (0 V) as the ground connected to the emitter. The output circuit 36 outputs such the voltage value as the detection signal to the state management circuit 110 via the signal line XP_PSPF. The state management circuit 110 determines that the supply of power from the power supply circuit 101 is invalid based on the received detection signal.

Specifically, when it is detected from the information of the detection resistor 108 that the power supply unit 30 exists, if the input voltage from the third voltage divider 34 falls below the reference voltage and the detection signal indicating a voltage drop is received from the signal line XP_PSPF, the state management circuit 110 determines that the supply of power is invalid. This is the case where the power supply unit 30 is connected to the main arithmetic unit 10 but a required voltage cannot be acquired due to failure of a part such as the voltage converter 38 or the like.

When such a determination of invalidity is made, the state management circuit 110 outputs to the bus master part 190 via the signal line PSPF the value indicating that the supply of power from the power supply circuit 101 is invalid. More specifically, when receiving a detection signal of 0 V via the signal line XP_PSPF, the state management circuit 110 switches a signal to be transmitted to the bus master part 190 and the secondary arithmetic unit 20 via the signal line PSPF from High to Low. In the case where the voltage divided by the fourth voltage divider 102 via the signal line XP_PSPF to the state management circuit 110 is equal to or higher than a predetermined voltage (e.g., 5 V), this signal is in the High state. In the case where it is detected that the voltage divided by the fourth voltage divider 102 is lower than the predetermined voltage, this signal is switched from the High state to the Low state. The bus master part 190 and the secondary arithmetic unit 20, in which a Low signal obtained by such switching from the High state to the Low state is detected, execute countermeasures against the case where the supply of power is invalid.

In addition, in the case where it is detected that the voltage divided by the fourth voltage divider 102 is equal to or higher than the predetermined voltage after switching to the Low signal, this signal is switched from the Low state to the High state. The bus master part 190 and the secondary arithmetic unit 20, in which a High signal obtained by such switching from the Low state to the High state is detected, execute countermeasures against the case where the supply of power is valid. As an example of the countermeasures against the valid case, normal processing is executed assuming that power is continuously supplied without being cut off.

Accordingly, the main arithmetic unit 10 of the control apparatus 100 is capable of reliably executing processing in the case where the supply of power is invalid or valid not only on the main arithmetic unit 10 itself but also on the other units connected thereto. Specifically, information relating to power cutoff detected by the main arithmetic unit 10 of the control apparatus 100 can be notified from the bus master part 190 to the functional unit 40 on the local bus 60 and the secondary arithmetic unit 20. In addition, the functional unit 40 and the secondary arithmetic unit 20 are capable of reliably executing processing including saving of data onto a memory, or invalidation of access to an SD card and so on in the case where the supply of power is invalid. In addition, the arithmetic processing part 180 is also capable of reliably executing the processing including saving of data and so on.

A voltage (e.g., 12 V) applied to the node N1 from the power supply unit 30 and driving the SoC 22 is applied to the first port 11 of the main arithmetic unit 10. Hence, in the case where power is supplied from the external power supply 50 to the power port 32, the voltage of the node N3 at a subsequent stage to the first port 11 becomes 12 V. The fourth voltage divider 102 inputs, to the state management circuit 110 via the signal line XP_PSPF, a voltage (e.g., 5 V) obtained by resistance-dividing the voltage (12 V). One end of the fourth voltage divider 102 is grounded.

E. Conclusion

As described above, the power supply circuit 101 of the main arithmetic unit 10 that constitutes the control apparatus 100 includes the first port 11 and the second port 12. The first port 11 is a port receiving power from the power supply unit 30 included in the control apparatus 100. The second port 12 is a port receiving power from a power supply apparatus different from the power supply unit 30. These ports are connected to the backup circuit 120 that holds the power used for the backup processing of the control apparatus 100. Based on the voltage of the first port 11 and the voltage of the second port 12, which relate to the method for supplying power, as well as the signal indicating whether or not the power supply unit 30 exists, which relates to the connection status with other units, the state management circuit 110 of the main arithmetic unit 10 outputs the state signal indicating whether or not the supply of power to the main arithmetic unit 10 is valid to the bus master part 190. The signal indicating whether or not the power supply unit 30 exists is detected by the voltage of the detection resistor (detection circuit) 108 that detects the existence of the power supply unit 30.

In this way, based on the presence or absence of connection with at least the power supply unit 30 and the method for supplying power in which the power is supplied from either the first port 11 or the second port 12, the main arithmetic unit 10 is capable of reliably determining the power supply state with respect to the main arithmetic unit 10 itself.

F. Determination Processing According to Connection State with Main Arithmetic Unit 10 and Whether or Not Main Arithmetic Unit 10 Can be Driven The determination processing of the power supply state depending on the connection status between the main arithmetic unit 10 and other units and the method for supplying power as explained above, as well as whether or not the main arithmetic unit 10 can be driven, which relates to the power supply state, are explained using FIG. 4 and FIG. 5.

Figure 4:
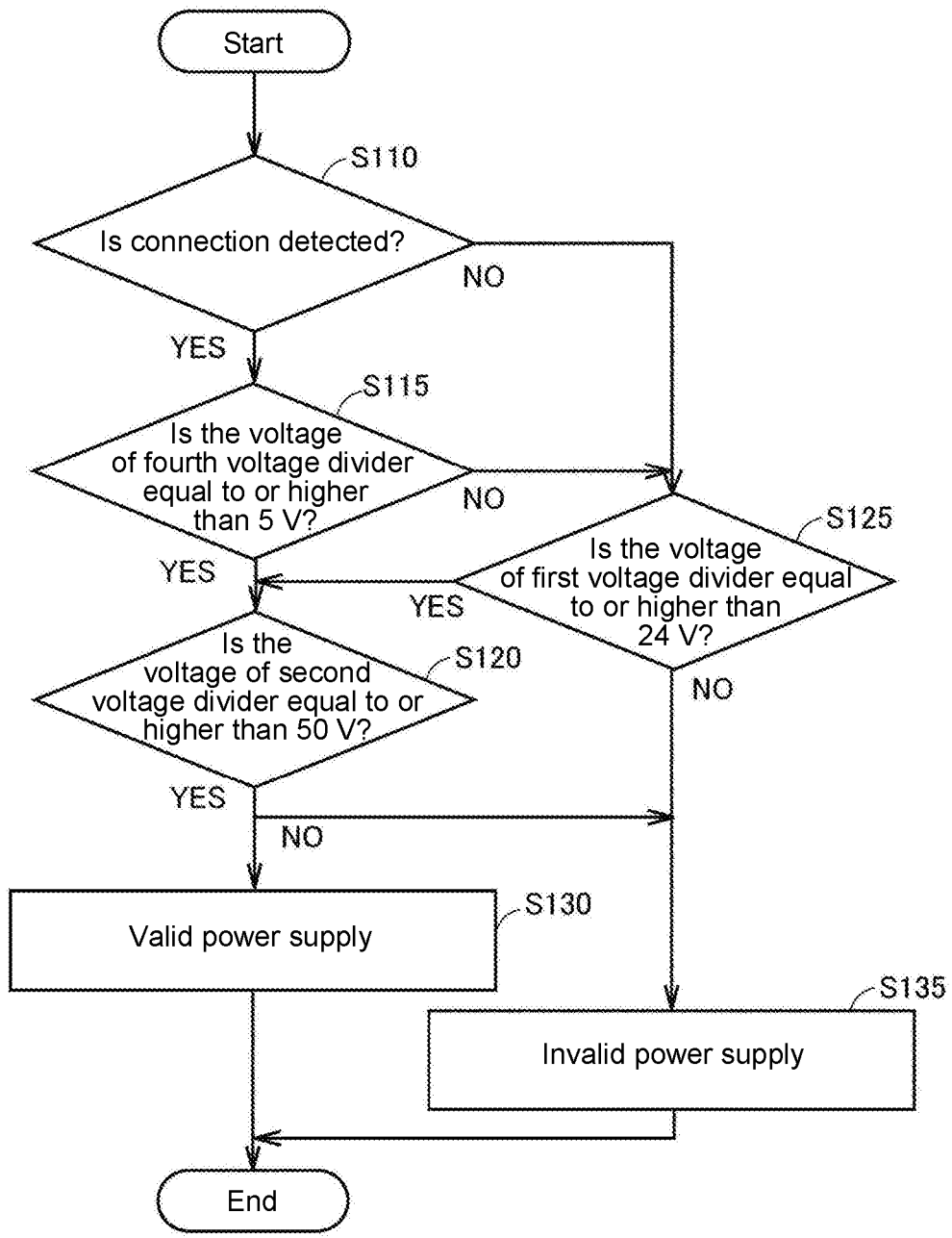
FIG. 4 is a flowchart explaining determination processing of a power supply state based on a connection status between the main arithmetic unit 10 and other units and a method for supplying power in accordance with the present embodiment.

FIG. 4 is a flowchart explaining the determination processing of the power supply state based on the connection status between the main arithmetic unit 10 and other units and a method for supplying power in accordance with the present embodiment.

In the processing of step S110, the state management circuit 110 of the main arithmetic unit 10 detects a connection status with other units. Regarding the determination of the connection status, the following explains the connection with the power supply unit 30. However, the same explanation may apply to the connection with the power supply unit 30 and the secondary arithmetic unit 20.

In the case where the power supply unit 30 is connected to the main arithmetic unit 10, the voltage of the detection resistor 108 becomes the voltage (0 V) having the same potential as the ground. Hence, in the case where a signal of the voltage (e.g., 0 V) having the same potential as the ground detected by the detection resistor 108 is received, the state management circuit 110 determines that the power supply unit 30 exists and switches the control to step S115.

In the processing of step S115, the state management circuit 110 receives the detection signal of the voltage divided by the fourth voltage divider 102 via the signal line XP_PSPF, and in the case where the voltage of the received detection signal is equal to or higher than the predetermined voltage (5 V), the state management circuit 110 determines that the supply of power is valid (YES in step S115) and switches the control to step S120.

In the processing of step S115, the state management circuit 110 receives the detection signal of the voltage divided by the fourth voltage divider 102 via the signal line XP_PSPF, and in the case where the voltage of the received detection signal falls below the predetermined voltage (5 V) (lower than the voltage), the state management circuit 110 determines that the supply of power is invalid (NO in step S115) and switches the control to step S125.

Back to the processing of step S110, in the case where the power supply unit 30 is not connected to the main arithmetic unit 10, the voltage of the detection resistor 108 becomes the voltage (5 V) of the control voltage Vcc. In the case where a signal of the control voltage (e.g., 5 V) detected by the detection resistor 108 is received, the state management circuit 110 determines that the power supply unit 30 does not exist and switches the control to step S125.

In the processing of step S125, when determining that the voltage input from the first voltage divider 104 falls below the predetermined threshold value (e.g., 24 V) (lower than the voltage) (NO in step S125), the state management circuit 110 switches the control to step S135.

In the processing of step S135, the state management circuit 110 determines that no power is supplied from any of the first port 11 and the second port 12 and that the supply of power is invalid. When such a determination is made, the state management circuit 110 outputs, to the bus master part 190 via the signal line PSPF, the value (e.g., a Low signal) indicating that the supply of power from the power supply circuit 101 is invalid.

In the processing of step S125, when determining that the voltage input from the first voltage divider 104 is equal to or higher than the predetermined threshold value (e.g., 24 V) (YES in step S125), the state management circuit 110 switches the control to step S120.

In the processing of step S120, when determining that the voltage input from the second voltage divider 106 falls below the predetermined threshold value (e.g., 50 V) (lower than the voltage) (NO in step S120), the state management circuit 110 switches the control to step S135, and determines that the supply of power is invalid.

Moreover, this determination is performed regardless of whether or not the power supply unit 30 is connected to the main arithmetic unit 10 (whether or not the power supply unit 30 exists). The reason is that, in the case where no electric charge is accumulated in the backup circuit, even if power is supplied to the power supply circuit 101 at the moment, when the supply of power is subsequently cut off, the main arithmetic unit 10 or the functional unit 40 or the like cannot perform the backup processing such as saving of data and so on.

In the processing of step S120, when determining that the voltage input from the second voltage divider 106 is equal to or higher than the predetermined threshold value (e.g., 50 V) (YES in step S120), the state management circuit 110 switches the control to step S130, and determines that the supply of power is valid. When such a determination is made, the state management circuit 110 outputs, to the bus master part 190 via the signal line PSPF, the value (e.g., a High signal) indicating that the supply of power from the power supply circuit 101 is valid. Accordingly, the main arithmetic unit 10 is capable of reliably detecting a power supply status.

FIG. 5 shows the correspondence table 380 relating to whether or not the main arithmetic unit 10 can be activated according to the power supply state in accordance with the present embodiment.

The correspondence table 380 includes a PRSN item 381 relating to information transmitted to the signal line PRSN, an XP_PSPF item 382 relating to information transmitted to the signal line XP_PSPF, a 24V_PSPF item 383 relating to information transmitted to the signal line 24V_PSPF, a 50V_PSPF item 384 relating to information transmitted to the signal line 50V_PSPF, and an activation enable/disable item 385 relating to information of whether or not the main arithmetic unit 10 can be activated.

The PRSN item 381 is an item indicating the presence or absence of connection with (the existence or non-existence of) the power supply unit 30 based on the voltage of the detection resistor 108. The following explains the existence or non-existence of the power supply unit 30, but the same explanation may apply to the existence or non-existence of the power supply unit 30 and the secondary arithmetic unit 20. The PRSN item 381 becomes "present" (the power supply unit 30 exists) in the case where the voltage of the detection resistor 108 becomes the voltage having the same potential as the ground, and becomes "absent" (the power supply unit 30 does not exist) in the case where the voltage of the detection resistor 108 becomes the control voltage (e.g., 5 V).

The XP_PSPF item 382 is an item indicating whether or not power is supplied to the first port 11 based on the voltage of the fourth voltage divider 102. This item becomes "○" in the case where power is supplied, becomes "x" in the case where no power is supplied, and becomes "-" in both cases (whichever is applicable).

The 24V_PSPF item 383 is an item indicating whether or not power is supplied to the second port 12 based on the voltage of the first voltage divider 104. This item becomes "○" in the case where power is supplied, becomes "x" in the case where no power is supplied, and becomes "-" in both cases (whichever is applicable).

The 50V_PSPF item 384 is an item indicating whether or not electric charge is charged into the capacitor 125 based on the voltage of the second voltage divider 106. This item becomes "β" in the case where electric charge is charged, becomes "x" in the case where no electric charge is charged, and becomes "-" in both cases (whichever is applicable).

The activation enable/disable item 385 is an item indicating whether or not the main arithmetic unit 10 can be activated. This item becomes "OK" in the case where the main arithmetic unit 10 can be activated, and becomes "NG" in the case where the main arithmetic unit 10 cannot be activated.

First of all, the case where the PRSN item 381 is "absent" is explained. In this case, since it is determined that the power supply unit 30 does not exist based on the voltage of the detection resistor 108, the XP_PSPF item 382 becomes "-". The reason that the XP_PSPF item 382 becomes "-" is that it includes the case where the power supply unit 30 is not connected and no power is supplied and the case where the power supply unit 30 is removed immediately before and the power supplied in the past remains. Since the PRSN item 381 is "absent", the supply of power by the power supply unit 30 is not performed.

Next, the cases where the 24V_PSPF item 383 is "○" and where it is "x" are explained. In the case where the 24V_PSPF item 383 is "○" and the 50V_PSPF item 384 is "0", the activation enable/disable item 385 becomes "OK". Since power is supplied from the second port 12 and electric charge is also charged into the capacitor 125, the main arithmetic unit 10 can be activated. The reason is that, in the case where the conditions of both the supply of power and the backup power are satisfied, the main arithmetic unit 10 can be activated, and even if the supply of power is cut off thereafter, the backup processing can be performed.

In the case where the 24V_PSPF item 383 is "○" and the 50V_PSPF item 384 is "x", the activation enable/disable item 385 becomes "NG". When power is supplied from the second port 12 while no electric charge is charged into the capacitor 125, the main arithmetic unit 10 cannot be activated. The reason is that, even if power is currently being supplied, when the supply of power is subsequently cut off, it becomes impossible for the main arithmetic unit 10 to execute the processing for backup using the electric charge of the capacitor 125.

In the case where the 24V_PSPF item 383 is "x" and the 50V_PSPF item 384 is "○", the activation enable/disable item 385 becomes "NG". The reason is that, in the case where no power is supplied from the second port 12, even if the main arithmetic unit 10 can be temporarily activated using the electric charge of the capacitor 125, the subsequent power cannot be secured. When no electric charge is charged into the capacitor 125, the main arithmetic unit 10 cannot be activated.

Next, explanations are separately given of when the XP_PSPF item 382 is "○" and when it is "x" in the case where the PRSN item 381 is "present". When the XP_PSPF item 382 is "○", the 24V_PSPF item 383 becomes "-", and if the 50V_PSPF item 384 is "○", the activation enable/disable item 385 becomes "OK". The reason is that, when the main arithmetic unit 10 and the power supply unit 30 exist, power is also supplied to the first port 11 and the electric charge for backup is charged into the capacitor 125, the main arithmetic unit 10 can be activated.

Moreover, in the case where the power supply unit 30 exists, since it may also be necessary to supply power to the secondary arithmetic unit 20, the supply of power by the power supply unit 30 is given priority. Hence, in the 24V_PSPF item 383, the supply of power from the second port 12 is indicated by "-". In this way, even if power is supplied from the second port 12, since power cannot be supplied to the secondary arithmetic unit 20 from the viewpoint of circuit configuration, both the case where the voltage is supplied from the second port 12 and the case where no voltage is supplied from the second port 12 are included (whichever is applicable).

When the XP_PSPF item 382 is "○", the 24V_PSPF item 383 becomes "-", and if the 50V_PSPF item 384 is "x", the activation enable/disable item 385 becomes "NG". The reason is that, even if power is currently being supplied, when the supply of power is subsequently cut off, it becomes impossible for the main arithmetic unit 10 to execute the processing for backup using the electric charge of the capacitor 125.

In the case where the PRSN item 381 is "present", when the XP_PSPF item 382 is "x", the 24V_PSPF item 383 becomes "-", and if the 50V_PSPF item 384 is "○", the activation enable/disable item 385 becomes "NG". The reason is that, although the power supply unit 30 exists, since power is not supplied to the first port 11, even if electric charge is charged into the capacitor 125, the electric charge is reduced by being used for backup of the main arithmetic unit 10, and the main arithmetic unit 10 cannot be activated.

When the XP_PSPF item 382 is "x", the 24V_PSPF item 383 becomes "-", and if the 50V_PSPF item 384 is "x", the activation enable/disable item 385 becomes "NG". As mentioned above, the reason is that, although the power supply unit 30 exists, since power is not supplied to the first port 11, and moreover, no electric charge is charged into the capacitor 125 (there is also no electric charge which can be used for backup of the main arithmetic unit 10), the main arithmetic unit 10 cannot be activated.

In this way, based on the connection status with the power supply unit 30, whether power is supplied from any of the first port 11 or the second port 12, and the method for supplying power including a charging state of the backup circuit, the main arithmetic unit 10 is capable of accurately determining the power supply state with respect to the main arithmetic unit 10 itself.

G. Modifications

In the present embodiment, it has been explained that the main arithmetic unit 10 sends the value indicating that supply of power is invalid to the bus master part 190 or the secondary arithmetic unit 20 via the signal line PSPF. In contrast, the object to which the main arithmetic unit 10 sends the value indicating that the supply of power is invalid is not limited to the bus master part 190 but may be other units.

In addition, as described above, the information sent via the signal line PSPE may be sent by high and low voltages using a signal line that transmits and receives internal commands of the control apparatus 100.

The value indicating that the supply of power is invalid, which is sent by the state management circuit 110 to the bus master part 190 or the like, may be sent from the arithmetic processing part 180 to the bus master part 190. That is, the arithmetic processing part 180 may receive from the state management circuit 110 the value indicating that the supply of power is invalid, and information relating to the received value indicating that the supply of power is invalid may be sent from the arithmetic processing part 180 to the bus master part 190.

H. Additional Remark

[Configuration 1]

An arithmetic unit (10) constituting a control apparatus (100) for controlling a control object, the arithmetic unit (10) including:

an arithmetic processing part (180), including a processor (184);

a bus master part (190), connected to the arithmetic processing part (180) and managing data transmission on a local bus (60); and a power supply circuit (101), receiving power from outside and supplying power to the arithmetic processing part (180) and the bus master part (190), wherein the power supply circuit (101) includes:

a first port (11), receiving power from a power supply unit (30) included in the control apparatus (100);

a second port (12), receiving power from a power supply apparatus different from the power supply unit (30);

a backup circuit (120), connected to both the first port (11) and the second port (12);

a detection circuit (108), detecting existence of the power supply unit (30); and a state management circuit (110), outputting a state signal indicating whether or not the supply of power from the power supply circuit (101) is valid, wherein the state management circuit (110) determines a value of the state signal based on a voltage of the second port (12), a voltage of the first port (11), and a signal indicating whether or not the power supply unit (30) exists.

[Configuration 2]

The arithmetic unit described in Configuration 1, wherein, when it is detected that the power supply unit (30) does not exist, if the voltage of the second port (12) falls below a predetermined first threshold value, the state management circuit outputs (110), as the value of the state signal, a value indicating that the supply of power from the power supply circuit (101) is invalid.

[Configuration 3]

The arithmetic unit described in Configuration 1 or 2, wherein, regardless of whether or not the power supply unit (30) exists, the state management circuit (110) outputs, as the value of the state signal, a value indicating that the supply of power from the power supply circuit (101) is invalid when a voltage output from the backup circuit (120) falls below a predetermined second threshold value.

[Configuration 4]

The arithmetic unit described in any one of Configurations 1 to 3, wherein a signal relating to a voltage of power input to the power supply unit (30) is input to the state management circuit (110), wherein when it is detected that the power supply unit (30) exists, if the voltage of the power input to the power supply unit (30) falls below a predetermined third threshold value, the state management circuit (110) outputs, as the value of the state signal, a value indicating that the supply of power from the power supply circuit (101) is invalid.

[Configuration 5]

The arithmetic unit described in any one of Configurations 1 to 4, wherein the power supply circuit (101) further includes a blocking circuit for preventing a current from flowing between the first port (11) and the second port (12).

[Configuration 6]

The arithmetic unit described in any one of Configurations 1 to 5, wherein the power supply circuit (101) includes a first voltage conversion circuit (130) for conversion to a first voltage lower than a voltage appearing at a connection node between the first port (11) and the second port (12).

[Configuration 7]

The arithmetic unit described in Configuration 6, wherein the backup circuit (120) further includes:
 a third voltage conversion circuit (124), arranged between the first port (11) and the second port (12) and the first voltage conversion circuit (130), and converting power supplied from a second voltage conversion circuit (122) for conversion to a second voltage higher than the first voltage into power having a third voltage lower than the second voltage; and
 a capacitor (125), connected between the second voltage conversion circuit (122) and the third voltage conversion circuit (124) and capable of storing at least a part of the power output from the second voltage conversion circuit (122).

[Configuration 8]

The arithmetic unit described in any one of Configurations 1 to 7, wherein a secondary arithmetic unit (20) is arranged between the power supply unit (30) and the arithmetic unit (10); and the detection circuit detects (108), in addition to the existence of the power supply unit (30), existence of the secondary arithmetic unit (20).

[Configuration 9]

A control apparatus (100) for controlling a control object, wherein the control apparatus includes an arithmetic unit (10) and a power supply unit (30),
 wherein the arithmetic unit (10) includes:
 a bus master part (190), connected to the arithmetic processing part (180) and managing data transmission on a local bus (60); and
 a power supply circuit (101), receiving power from outside and supplying power to the arithmetic processing part (180) and the bus master part (190),
 wherein the power supply circuit (101) includes:
 a first port (11), receiving power from a power supply unit (30) included in the control apparatus (100);
 a second port (12), receiving power from a power supply apparatus different from the power supply unit (30);
 a backup circuit (120), connected to both the first port (11) and the second port (12);
 a detection circuit (108), detecting existence of the power supply unit (30); and
 a state management circuit (110), outputting a state signal indicating whether or not the supply of power from the power supply circuit (101) is valid,
 wherein the state management circuit (110) determines a value of the state signal based on a voltage of the second port (12), a voltage of the first port (11), and a signal indicating whether or not the power supply unit (30) exists.

The embodiments disclosed herein are examples in all aspects and should not be interpreted as limitations. The scope of the disclosure is defined by claims instead of the above explanation, and it is intended to include all modifications within the scope of the claims and the equivalents thereof.

What is claimed is:

1. An arithmetic unit constituting a control apparatus for controlling a control object, the arithmetic unit comprising:
 an arithmetic processing part, comprising a processor;
 a bus master part, connected to the arithmetic processing part, and managing data transmission on a local bus; and
 a power supply circuit, receiving power from outside and supplying power to the arithmetic processing part and the bus master part, wherein the power supply circuit comprises:
 a first port, receiving power from a power supply unit comprised in the control apparatus;
 a second port, receiving power from a power supply apparatus different from the power supply unit;
 a backup circuit, connected to both the first port and the second port;
 a detection circuit, detecting existence of the power supply unit; and
 a state management circuit, outputting a state signal indicating whether or not the supply of power from the power supply circuit is valid,
 wherein the state management circuit determines a value of the state signal based on a voltage of the second port, a voltage of the first port, and a signal indicating whether or not the power supply unit exists,
 wherein, when the voltage of the second port falls below a predetermined first threshold value after detecting that the power supply unit does not exist, the state management circuit outputs, as the value of the state signal, a value indicating that the supply of power from the power supply circuit is invalid.

2. The arithmetic unit according to claim 1, wherein, regardless of whether or not the power supply unit exists, the state management circuit outputs, as the value of the state signal, a value indicating that the supply of power from the power supply circuit is invalid when a voltage output from the backup circuit falls below a predetermined second threshold value.

3. The arithmetic unit according to claim 2, wherein
 a signal relating to a voltage of power input to the power supply unit is input to the state management circuit, and
 when it is detected that the power supply unit exists, if the voltage of the power input to the power supply unit falls below a predetermined third threshold value, the state management circuit outputs, as the value of the state signal, a value indicating that the supply of power from the power supply circuit is invalid.

4. The arithmetic unit according to claim 2, wherein the power supply circuit further comprises a blocking circuit for preventing a current from flowing between the first port and the second port.

5. The arithmetic unit according to claim 2, wherein the power supply circuit comprises a first voltage conversion circuit for conversion to a first voltage lower than a voltage appearing at a connection node between the first port and the second port.

6. The arithmetic unit according to claim 2, wherein
 a secondary arithmetic unit is arranged between the power supply unit and the arithmetic unit; and
 the detection circuit detects, in addition to the existence of the power supply unit, existence of the secondary arithmetic unit.

7. The arithmetic unit according to claim 1, wherein
a signal relating to a voltage of power input to the power supply unit is input to the state management circuit, and
when it is detected that the power supply unit exists, if the voltage of the power input to the power supply unit falls below a predetermined third threshold value, the state management circuit outputs, as the value of the state signal, a value indicating that the supply of power from the power supply circuit is invalid.

8. The arithmetic unit according to claim 7, wherein the power supply circuit further comprises a blocking circuit for preventing a current from flowing between the first port and the second port.

9. The arithmetic unit according to claim 7, wherein the power supply circuit comprises a first voltage conversion circuit for conversion to a first voltage lower than a voltage appearing at a connection node between the first port and the second port.

10. The arithmetic unit according to claim 1, wherein the power supply circuit further comprises a blocking circuit for preventing a current from flowing between the first port and the second port.

11. The arithmetic unit according to claim 1, wherein the power supply circuit comprises a first voltage conversion circuit for conversion to a first voltage lower than a voltage appearing at a connection node between the first port and the second port.

12. The arithmetic unit according to claim 11, wherein the backup circuit further comprises:
a third voltage conversion circuit, arranged between the first port and the second port and the first voltage conversion circuit, and converting power supplied from a second voltage conversion circuit for conversion to a second voltage higher than the first voltage into power having a third voltage lower than the second voltage; and
a capacitor, connected between the second voltage conversion circuit and the third voltage conversion circuit and capable of storing at least a part of the power output from the second voltage conversion circuit.

13. The arithmetic unit according to claim 2, wherein
a secondary arithmetic unit is arranged between the power supply unit and the arithmetic unit; and
the detection circuit detects, in addition to the existence of the power supply unit, existence of the secondary arithmetic unit.

14. The arithmetic unit according to claim 1, wherein the state management circuit outputs, as the value of the state signal, a value indicating that the supply of power from the power supply circuit is valid when power is supplied from the second port and electric charge is charged into the backup circuit, or the supply of power from the power supply circuit is valid when power is supplied to the first port and electric charge is charged into the backup circuit,
wherein power supplied from the second port is detected when the voltage of the second port do not fall below the predetermined first threshold value,
wherein power supplied from the first port is detected when the voltage of the first port do not fall below a predetermined third threshold value,
wherein electric charge charged into the backup circuit is detected when a voltage outputted from the backup circuit do not fall below a predetermined second threshold value.

15. A control apparatus for controlling a control object, wherein the control apparatus comprises an arithmetic unit and a power supply unit, and the arithmetic unit comprises:
an arithmetic processing part, comprising a processor;
a bus master part, connected to the arithmetic processing part, and managing data transmission on a local bus; and
a power supply circuit, receiving power from outside and supplying power to the arithmetic processing part and the bus master part, wherein the power supply circuit comprises:
a first port, receiving power from the power supply unit comprised in the control apparatus;
a second port, receiving power from a power supply apparatus different from the power supply unit;
a backup circuit, connected to both the first port and the second port;
a detection circuit, detecting existence of the power supply unit; and
a state management circuit, outputting a state signal indicating whether or not the supply of power from the power supply circuit is valid,
wherein the state management circuit determines a value of the state signal based on a voltage of the second port, a voltage of the first port, and a signal indicating whether or not the power supply unit exists
wherein, when the voltage of the second port falls below a predetermined first threshold value after detecting that the power supply unit does not exist, the state management circuit outputs, as the value of the state signal, a value indicating that the supply of power from the power supply circuit is invalid.

* * * * *